Patented May 6, 1930

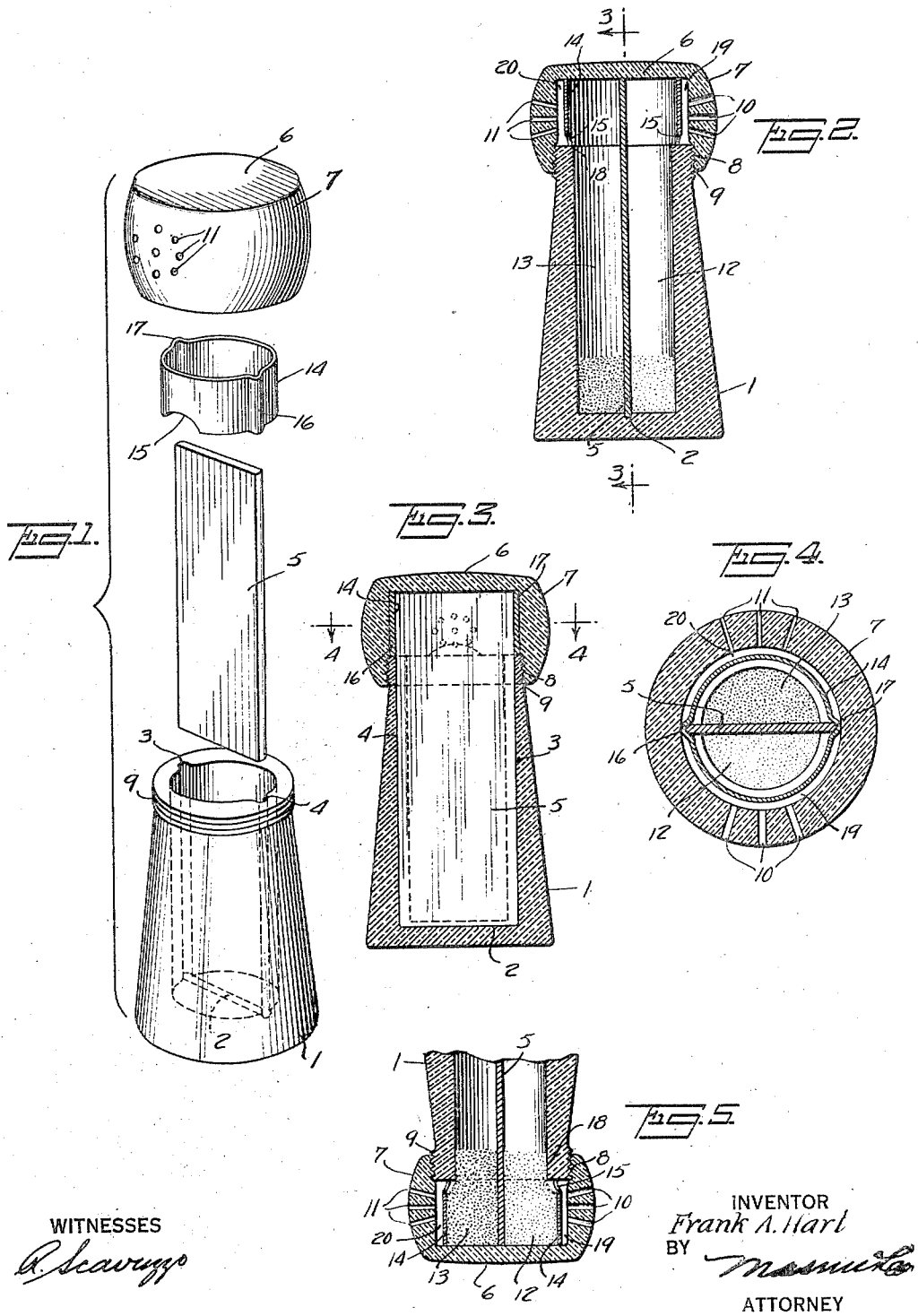

1,757,525

UNITED STATES PATENT OFFICE

FRANK A. HART, OF NEW YORK, N. Y.

CONDIMENT HOLDER

Application filed March 2, 1929. Serial No. 343,925.

This invention relates to condiment holders, and particularly to an improved construction wherein salt and pepper and other condiments may be served from a single holder, the object being to provide a construction which is simple, strong and comparatively inexpensive, while at the same time functioning to prevent the mixture of the condiments.

Another object of the invention is to provide a holder which is adapted to dispense salt or pepper or other matter, the structure involving a partitioned container with a removable cap formed with dispensing apertures on diametrically opposite sides.

A further object is to provide a condiment holder wherein salt and pepper may be served from the same holder but maintained separate, the structure being such that a free circulation of air is prevented, and consequently, the condiments may be maintained free from moisture so that lumps will not form therein.

A further object, more specifically, is to provide a condiment holder divided into a plurality of compartments for receiving different condiments, the structure being such that the discharge openings are on the sides of the cap and means are associated with the cap to prevent any of the condiments from flowing through the discharge openings when the device is inverted.

In the accompanying drawing,—

Figure 1 is a view showing a condiment holder embodying the invention, the various parts being separated but aligned ready to be assembled;

Figure 2 is a longitudinal vertical sectional view through a condiment holder embodying the invention, the same being shown with all parts in position ready for use;

Figure 3 is a sectional view through Figure 2 on the line 3—3;

Figure 4 is a transverse sectional view through Figure 3 on the line 4—4, the same being on an enlarged scale;

Figure 5 is a view similar to the upper part of Figure 2 but showing the holder inverted.

Referring to the accompanying drawings by numerals, 1 indicates a container adapted to receive salt and pepper or other condiment. The device will be described in respect to salt and pepper, though when these terms are used it will be understood that any desired kind of condiment may be used in the device. The container 1 is made of a desired size and may be made from glass, porcelain, metal or other desired material. In the formation of the container 1 a groove 2 is formed in the bottom and grooves 3 and 4 are formed in the sides so as to receive the division plate 5. This plate may be held in place by friction, cement or in any other desired way. Under some circumstances this division plate may be made integral, but when made is proportioned to project above the top of container 1 so as to come in contact with the top plate or section 6 of the cover 7 when the cover 7 is screwed down fully. The cover 7 may be made of metal or any other desired material and is connected to the holder 1 by reason of the threads 8 on the cover or cap and threads 9 on the container 1. A group of outlets or discharge apertures 10 is made on one side of the cap 7 and a second group 11 is formed on the opposite side so as to receive salt and pepper from the respective compartments 12 and 13. It will be noted that these apertures are on the sides of the cap and not on the end, so that the device may be inverted, as shown in Figure 5, and none of the contents of the container discharged. To prevent a discharge until the container is in a substantially horizontal position the specially constructed ring 14 is provided. This ring may be made of metal or other desired material and is formed with a pair of notches 15 and with bent-out portions 16 and 17, whereby it may snugly fit over the edges of that portion of the plate 5 which project above the holder 1. As clearly shown in Figure 5, the ring 14 sets back from the edge 18 so that when the holder is inverted the salt and pepper will enter the ring 14 but will not pass out through the notches 15. The portions 16 and 17 also act as division walls for dividing compartment 12 from compartment 13, whereby the salt and pepper will not mix. As the ring 14 is of less diameter than the inside diameter of cap 5 there will be provided spaces or chambers 19 and 20 into which the salt and pepper must pass before passing out through the apertures 10 and 11. In this way the salt and pepper are kept separately and also the arrangement permits the ready discharge of the salt and pepper but prevents undesirable, large quantities from being discharged accidently.

As shown in the drawing, the container 1 has a comparatively large base and tapers upwardly to the top, whereby the device has a low center of gravity, and consequently will not readily upset. The arrangement of the apertures 10 and 11 on opposite sides permits either salt or pepper to be discharged independently, and also the back and forth movement permits both salt and pepper to be discharged simultaneously. From Figure 3 it will be noted that the device is made from a minimum number of parts and consequently will be inexpensive to manufacture and readily assembled at any time. Also, the structure is such that it lends itself to being readily made ornamental, as well as readily filled and cleaned.

What I claim is:—

1. A condiment holder, comprising a container, means for dividing the container into compartments, a cap for the container having discharge openings extending normal to the axis of the container, certain of said discharge openings communicating with each compartment, and a control ring coacting with the container, the cap, and the division means for preventing the discharge of any of the condiments from any compartment until the holder is in a substantially horizontal position.

2. A condiment holder, comprising a container, a division plate arranged in said container for dividing the container into compartments, said division plate extending above the container, a cap screwed onto the container formed to fit tightly against the top of said division plate, and a ring arranged between the cap fitting against the cap and against the top of said container, said ring having diametrically opposite notches, said ring being of a size whereby it is spaced outwardly from the edge of the bore of said container, said cap having a plurality of discharge openings adjacent each of said notches.

3. A condiment holder, including a container with a removable cap therefor having discharge apertures and a ring fitted between the cap and container and spaced from the bore of the container, said ring having a notch whereby when the device is held horizontally the contents will be discharged and when positioned vertically with either end up the contents are prevented from being discharged.

4. A condiment holder, including a container having a bore, a plate for dividing the bore into two compartments, said plate projecting beyond the container, a ring at two points snugly fitting the edges of the projecting part of said plate, said ring having a notch on diametrically opposite sides, said ring being of a size to be spaced outwardly from the walls of said bore, whereby when the container is inverted the condiments therein will not flow out through said notches, and a removable cap for said container, said cap having discharge openings opposite said notches, and a top plate fitting tightly against the outer edge of said ring and the outer end of said plate.

5. A condiment holder formed with four parts consisting of a container, a division plate, a cap removably connected to the container, a condiment-retaining ring fitted against the upper part of said plate and resting on top of the container but spaced outwardly from the inner walls thereof, said ring having notches therein at the edge adjacent the container and said cap having discharge openings adjacent the notches in the ring, whereby the contents of the container will not be discharged when the container is in an inverted position but will only be discharged when arranged substantially horizontally.

6. A condiment holder, including a container open at one end, a ring normally resting on said container at the open end but spaced radially outwardly from the inside walls of the container, said ring having a discharge opening at the edge nearest the bottom of the container, and an apertured cap removably mounted on said container and on said ring, the apertures in said cap extending radially.

7. In a condiment holder a guarding ring formed with a pair of notches in one end and a pair of diametrically opposite projecting portions, each of said projecting portions having a groove in the inner surface.

Signed at New York, in the county of New York and State of New York, this 27th day of February, A. D. 1929.

FRANK A. HART.